(12) United States Patent
Felstaine et al.

(10) Patent No.: US 10,164,944 B1
(45) Date of Patent: Dec. 25, 2018

(54) SYSTEM, METHOD, AND COMPUTER PROGRAM FOR IMPLEMENTING A VIRTUAL OBFUSCATION SERVICE IN A NETWORK

(71) Applicant: Amdocs Software Systems Limited, Dublin (IE)

(72) Inventors: Eyal Felstaine, Hertzeliya (IL); Itzik Kitroser, Beer Sheva (IL); Ofer Hermoni, Yavne (IL); Shmuel Ur, Shorashim (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 0 days.

(21) Appl. No.: 14/819,263

(22) Filed: Aug. 5, 2015

Related U.S. Application Data

(60) Provisional application No. 62/033,615, filed on Aug. 5, 2014.

(51) Int. Cl.
*H04L 29/06* (2006.01)

(52) U.S. Cl.
CPC .......... *H04L 63/04* (2013.01); *H04L 63/0428* (2013.01); *H04L 63/1441* (2013.01)

(58) Field of Classification Search
CPC ............. H04L 63/0272; H04L 63/0407; H04L 63/0428; H04L 63/20; H04L 63/04; H04L 12/4633
See application file for complete search history.

(56) References Cited

U.S. PATENT DOCUMENTS 8,856,300 B2 * 10/2014 de los Reyes .......... H04L 63/20
709/203
9,225,638 B2 * 12/2015 Jain ........................ H04L 67/10
(Continued)

OTHER PUBLICATIONS

V. Shmatikov et al., Timing Analysis in Low Latency Mix Networks: Attacks and Defenses, Computer Security ESORICS 2006: 11th Symposium on Research in Computer Security, Proceedings, Hamburg, Germany, Sep. 18-20, 2006, pp. 18-33.*

*Primary Examiner* — Hadi S Armouche
*Assistant Examiner* — Paul E Callahan
(74) *Attorney, Agent, or Firm* — Zilka-Kotab, P.C.

(57) ABSTRACT

A system, method, and computer program product are provided for implementing a virtual obfuscation service in a network. In use, an obfuscation service component is initiated in a network system including one or more virtual services, the obfuscation service component including at least one of: at least one first obfuscation service component associated with a physical portion of the network system or at least one second obfuscation service component associated with a cloud-based virtual portion of the network system. Further, communication to be sent from the physical portion of the network system to the cloud-based virtual portion of the network system is identified. Additionally, the communication is directed from the physical portion of the network system to the first obfuscation service component associated with the physical portion of the network system. Furthermore, the communication is sent from the first obfuscation service component associated with the physical portion of the network system to the second obfuscation service component associated with the cloud-based virtual portion of the network system.

7 Claims, 8 Drawing Sheets

(56) References Cited

U.S. PATENT DOCUMENTS

| | | | |
|---|---|---|---|
| 9,276,959 B2 * | 3/2016 | Theimer | H04L 63/20 |
| 2010/0093359 A1 * | 4/2010 | Gallagher | H04W 16/32 |
| | | | 455/445 |
| 2016/0099959 A1 * | 4/2016 | Yanovsky | G06F 21/552 |
| | | | 726/23 |

* cited by examiner

US 10,164,944 B1

SYSTEM, METHOD, AND COMPUTER PROGRAM FOR IMPLEMENTING A VIRTUAL OBFUSCATION SERVICE IN A NETWORK

CLAIM OF PRIORITY AND RELATED APPLICATIONS

This application claims the benefit of U.S. Provisional Application No. 62/033,615, filed Aug. 5, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, as companies move from physical on premise systems to virtual in the cloud systems, there are justifiable security concerns.

There is thus a need for addressing these and/or other issues associated with the prior art.

SUMMARY

A system, method, and computer program product are provided for implementing a virtual obfuscation service in a network. In use, an obfuscation service component is initiated in a network system including one or more virtual services, the obfuscation service component including at least one of: at least one first obfuscation service component associated with a physical portion of the network system or at least one second obfuscation service component associated with a cloud-based virtual portion of the network system. Further, communication to be sent from the physical portion of the network system to the cloud-based virtual portion of the network system is identified. Additionally, the communication is directed from the physical portion of the network system to the first obfuscation service component associated with the physical portion of the network system. Furthermore, the communication is sent from the first obfuscation service component associated with the physical portion of the network system to the second obfuscation service component associated with the cloud-based virtual portion of the network system.

DETAILED DESCRIPTION

Figure 1:
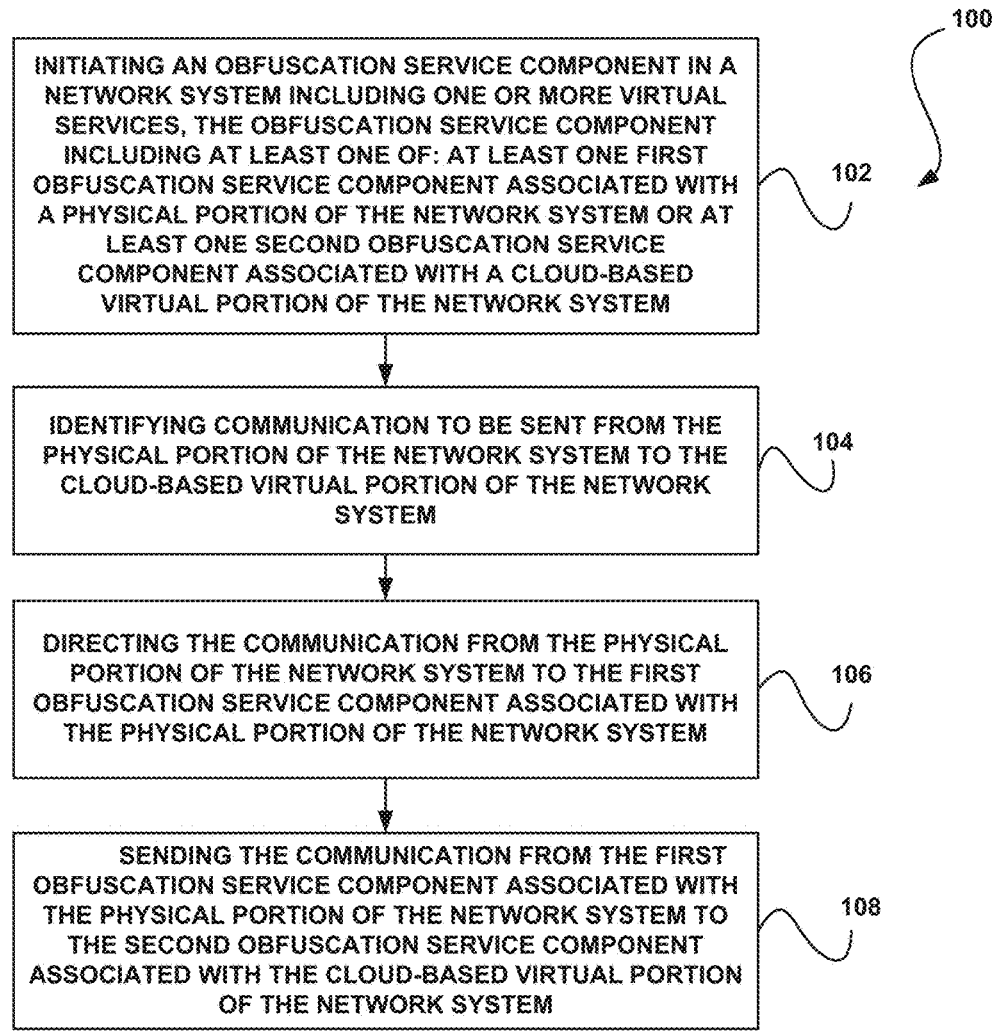
FIG. 1 illustrates a method for implementing a virtual obfuscation service in a network, in accordance with one embodiment.

FIG. 1 illustrates a method 100 for implementing a virtual obfuscation service in a network, in accordance with one embodiment.

As shown, an obfuscation service component is initiated in a network system including one or more virtual services, the obfuscation service component including at least one of: at least one first obfuscation service component associated with a physical portion of the network system or at least one second obfuscation service component associated with a cloud-based virtual portion of the network system. See operation 102.

The network system may include any type of system with various physical network components and/or virtual network components. In one embodiment, the network system may include an NFV-based network. Further, the network system may include a physical portion and a virtual cloud-based portion (e.g. including virtual services, etc.). In one embodiment, the first obfuscation service component may be part of the physical portion of the system and the second obfuscation service component may be part of the virtual cloud-based portion.

The obfuscation service component may include one or more virtual network functions or features (VNFs). In one embodiment, the first obfuscation service component may include a first one or more VNFs and the second obfuscation service component may include a second one or more VNFs.

As shown further in FIG. 1, communication to be sent from the physical portion of the network system to the cloud-based virtual portion of the network system is identified. See operation 104.

Additionally, the communication is directed from the physical portion of the network system to the first obfuscation service component associated with the physical portion of the network system. See operation 106.

Furthermore, the communication is sent from the first obfuscation service component associated with the physical portion of the network system to the second obfuscation service component associated with the cloud-based virtual portion of the network system. See operation 108.

In addition, in one embodiment, the communication may be sent from the second obfuscation service component associated with the cloud-based virtual portion of the network system to the one or more virtual services in the cloud-based virtual portion of the network system.

Of course, the second obfuscation service component associated with the cloud-based virtual portion of the network system may also function to send communications to the first obfuscation service component. For example, communication to be sent from the cloud-based virtual portion of the network system to the physical portion of the network system may be identified. The communication may be directed from the cloud-based virtual portion of the network system to the second obfuscation service component.

Furthermore, the communication may be sent from the second obfuscation service component associated with the cloud-based virtual portion of the network system to the first obfuscation service component associated with the physical portion of the network system. In addition, the communication may be sent from the first obfuscation service component to one or more services or components in the physical portion of the network system.

The first obfuscation service component and the second obfuscation service component may receive communications from a plurality of sources (e.g. physical components, virtual services, etc.). Additionally, the obfuscation service components may mark each communication according to a respective source (e.g. in a static manner, in a non-static manner, etc.).

For example, the first obfuscation service component may mark each communication received and forward each marked communication to the second obfuscation service component associated with the cloud-based virtual portion of the network system. Additionally, the first obfuscation service component may receive additional communication from the second obfuscation service component associated with the cloud-based virtual portion of the network system. In this case, the first obfuscation service component may decode the additional communication, as the communication may have been marked and/or encoded by the second obfuscation service component. The first obfuscation service component may then forward the decoded additional communication to correct network components in the physical portion of the network system.

Of course, the second obfuscation service component associated with the cloud-based virtual portion of the network system may receive the communication from the first obfuscation service component associated with the physical portion of the network system. In this case, the second obfuscation service component may decode the communication from the first obfuscation service component and send the decoded communication to correct virtual services of the cloud-based virtual portion of the network system.

In one embodiment, each of the obfuscation service components may perform encryption of outgoing communications. Furthermore, each of the obfuscation service components may perform packaging of packets for multiple sources. For example, the first obfuscation service component may perform packaging of packets from multiple sources and the second obfuscation service component may perform un-packaging of the packaged packets from the multiple sources.

Additionally, in one embodiment, each of the obfuscation service components may perform timing changes of outgoing communications to prevent timing attacks. As another option, each of the obfuscation service components may perform padding of outgoing communications. For example, the padding may include adding false traffic to the communication to obfuscate an amount of traffic that is occurring.

In one embodiment, the obfuscation service component may be initiated on demand. As an option, this may be due to a warning received (e.g. in times of attacks, etc.) and upon a specific condition (e.g. handling sensitive data, etc.). Thus, the obfuscation service does not always have to be operational.

Additionally, in one embodiment, the second obfuscation service component associated with the virtual cloud-based portion use may include multiple components used on multiple clouds. For example, each cloud may include a second obfuscation service component. In this case, the first obfuscation service component may communicate with multiple second obfuscation service components on different clouds. In another embodiment, there may be multiple first obfuscation service components each connected to a subset of the virtual services and to a single second obfuscation service component (e.g. or a different implementation for each cloud, etc.), or any combination thereof.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breach or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breach or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
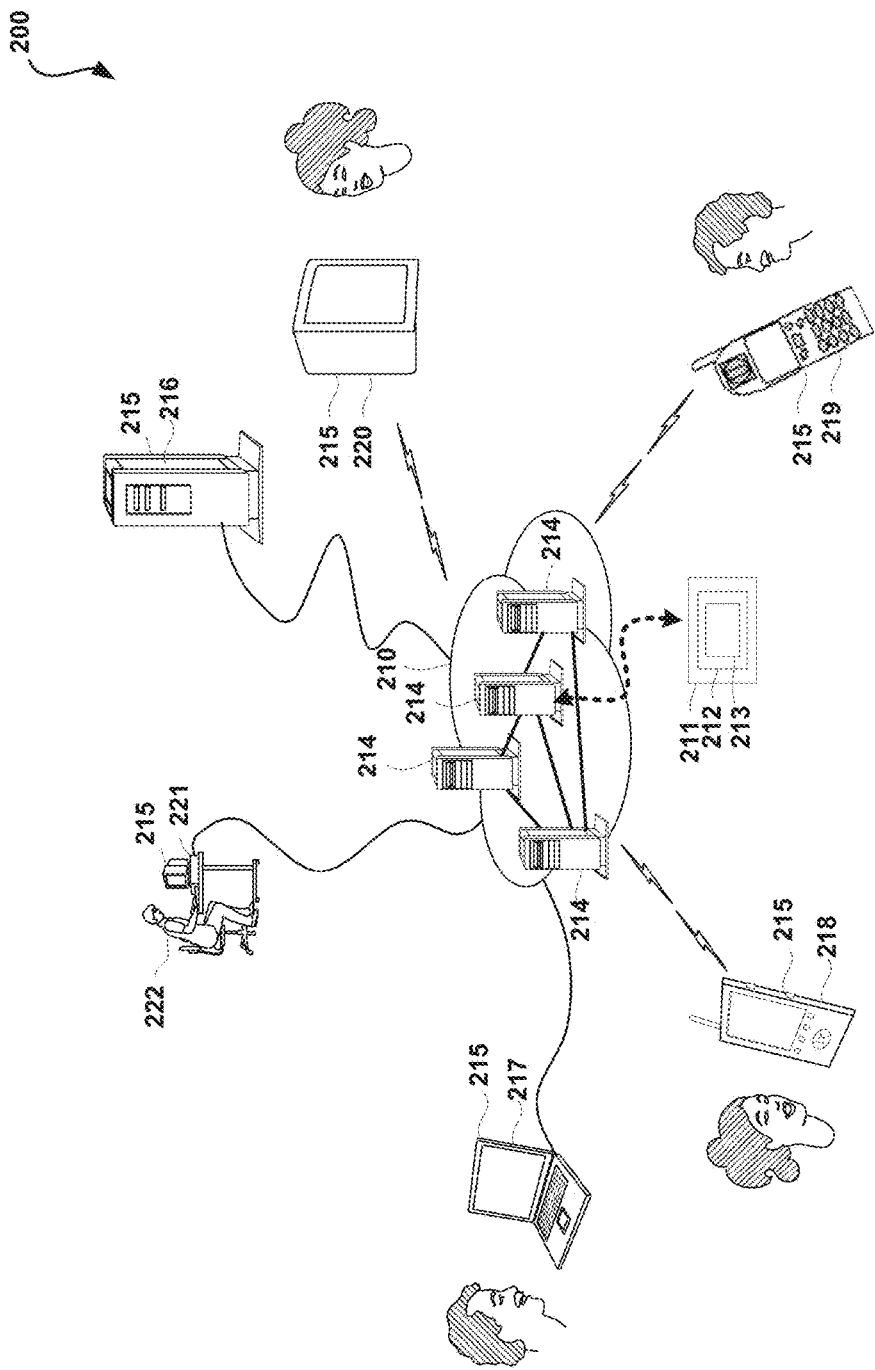
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and an obfuscation service module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the obfuscation service module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The obfuscation service module 213 may be a part or a component of the NFV-O module 212. However, the obfuscation service module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the obfuscation service module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the obfuscation service module 213.

Figure 3:
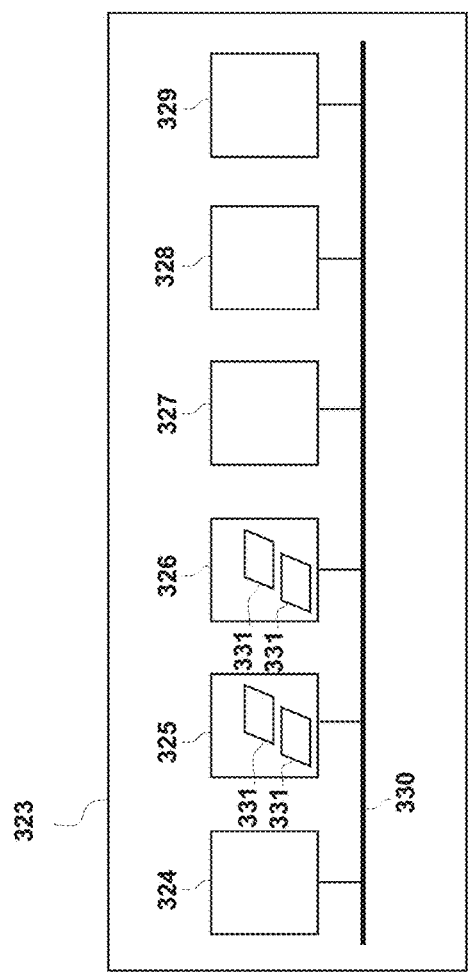
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the obfuscation service module 213 of FIG. 2.

Figure 4:
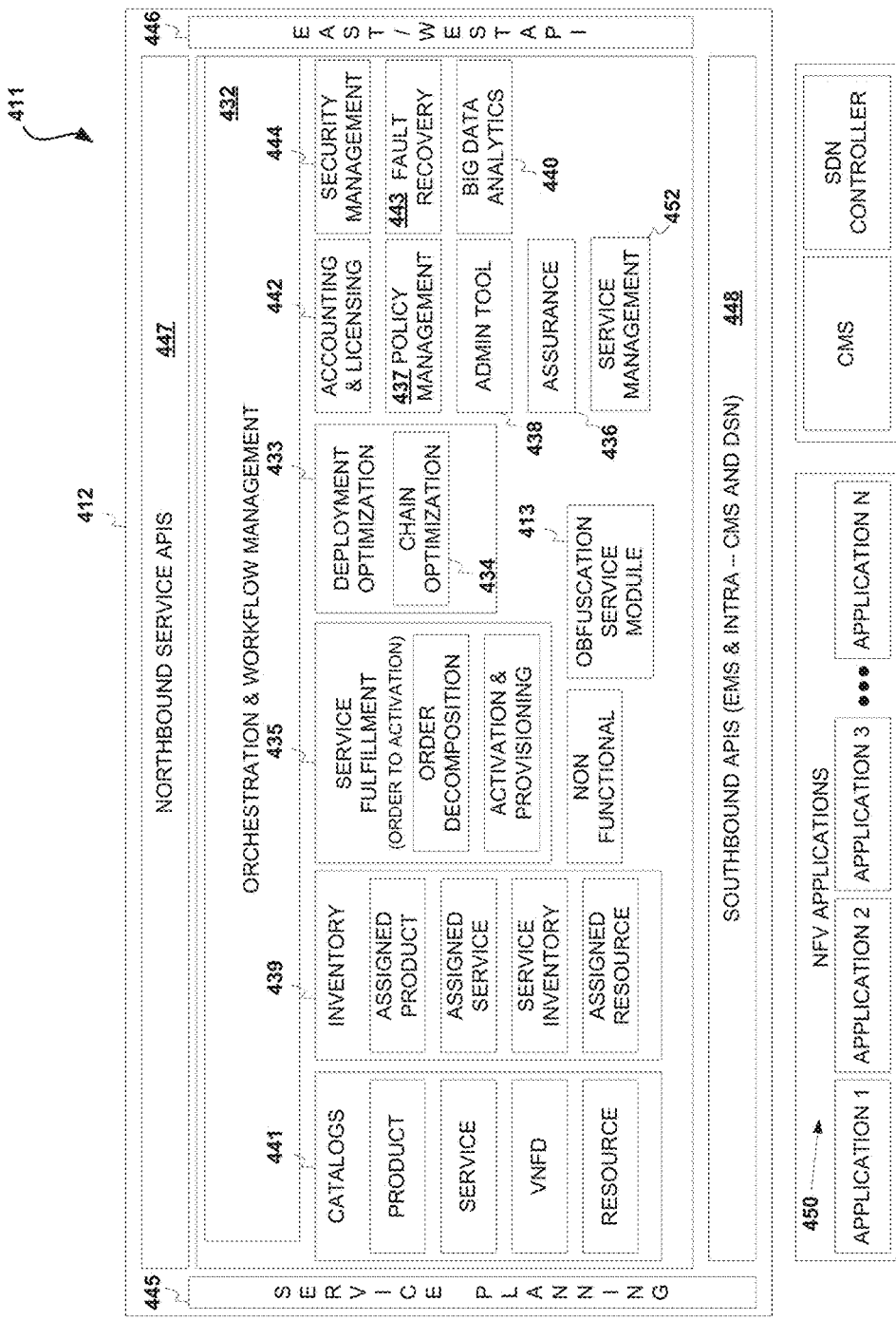
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and an obfuscation service module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations. What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The obfuscation service module 413 may also be part of the NFV-O module 412. The obfuscation service module 413 may operable to implement some or all of the functionality described in the context of FIG. 1.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
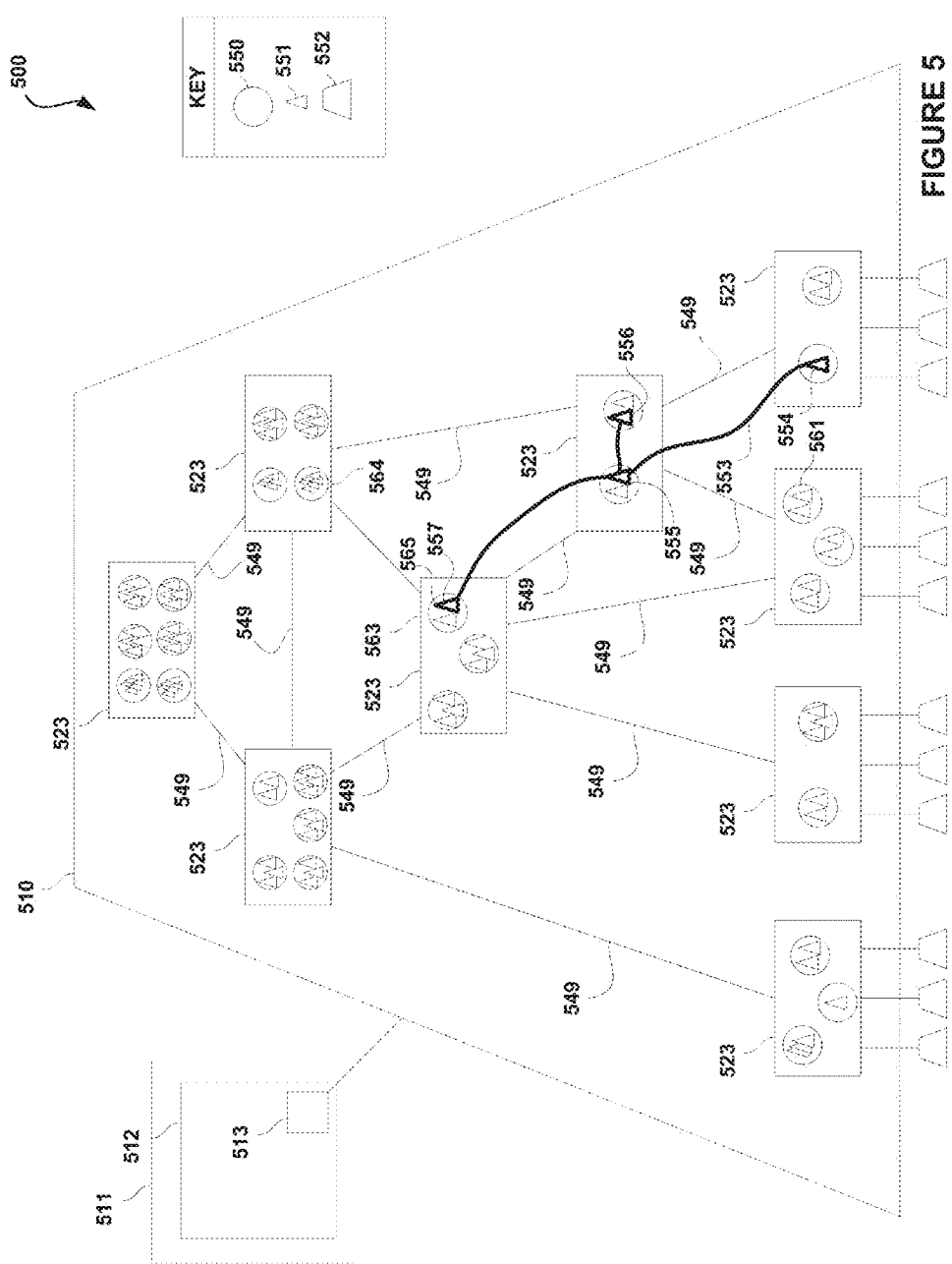
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and an obfuscation service module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

When services move from physical on premise systems to virtual in the cloud system, there are justifiable security concerns. These concerns are present when there is a new design from the ground up NFV system that moves everything to the cloud, and even more so when there is an upgrade of a legacy system with a few virtual services on the cloud. Accordingly, there may be a system that was not verified and part with part of the system being on the cloud. It is desirable to ensure security and privacy of communications in the system.

Even if it is assumed that somehow everything has been encrypted, steps have been taken against man in the middle attacks, and a provider is secure and does not let a competitor perform side channel attacks, there is almost no scenario under which the communication with the cloud, or clouds, can presently be monitored.

When a service is replaced by a virtual service, someone monitoring the system can gather additional information just by observing the traffic. The attacker can learn the load on each service by observing how much traffic it has. This can be very valuable for figuring out what the system is currently doing. For example, if a security service is monitored, personnel may realize that an attack has been uncovered.

If a financial service is being monitored, personnel may realize that a lot of trading is currently occurring and may try to ascertain the reason. Further, if a service can perform a number of actions, each of which require a different amount of traffic, or a different amount of CPU, by analyzing the volume and timing, much be learned about what the service is doing. For example, if there is an authentication service and the time for response for correct password or incorrect password is different, one can learn how many times people tried incorrect passwords.

Thus, there is a need to supply a technique for obfuscating the communication either when a full virtual solution is used but even more so when a few physical services are replaced by virtual services, and even when all the system is physical but virtual services are used to support only at peak time. Furthermore, in one embodiment, this kind of security may be desired only at specific time and may be requested on demand.

Accordingly, by implementing the techniques described herein a new kind of service may be added to a system (e.g. a physical system, virtual system, or hybrid), which has a counterpart cloud component for obfuscating traffic. In one embodiment, this service may be raised or removed at any time and may be used to add an obfuscation layer to the system.

Figure 6:
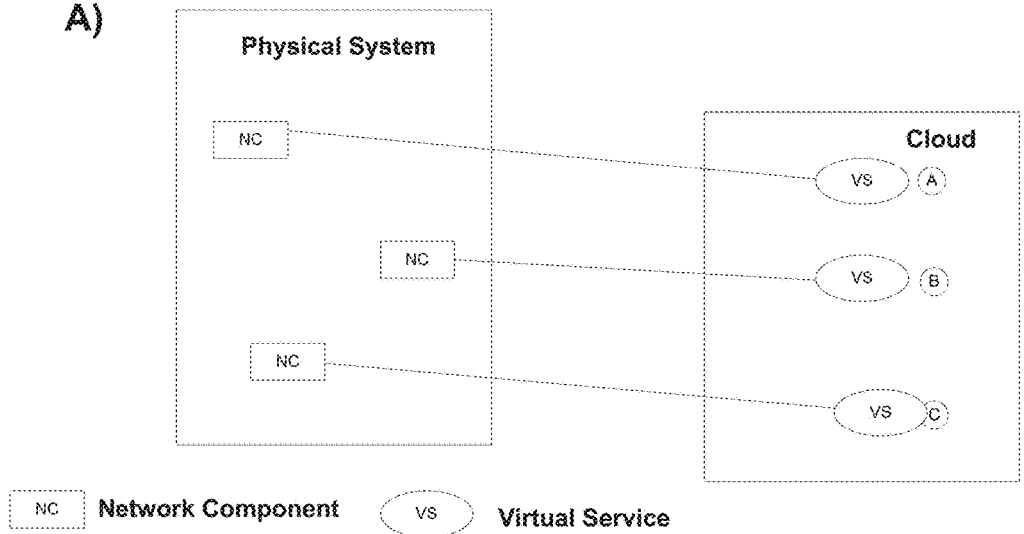
FIG. 6 illustrates a system for implementing a virtual obfuscation service in a network, in accordance with one embodiment.
Figure 6:
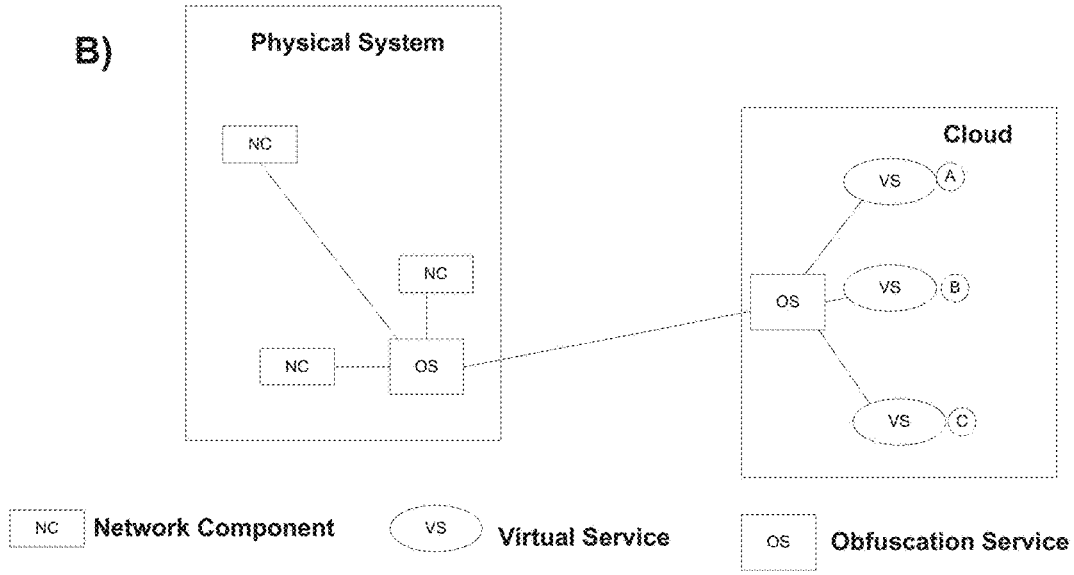

FIG. 6 illustrates a system 600 for implementing a virtual obfuscation service in a network, in accordance with one embodiment. As an option, the system 600 may be implemented in the context of the details of the previous Figures. Of course, however, system 600 may be implemented in the context of any desired environment. Further, the aforementioned definitions may equally apply to the description below.

As shown in configuration A of FIG. 6, network components of a physical system may send communications to virtual services in a cloud, without obfuscating the communication. However, when a user wants added security, the user raises the obfuscation service, as shown in configuration B of FIG. 6. Once it is up it, every other communication that is supposed to go to the cloud is directed to the obfuscation service instead of the cloud (e.g. the system may be a physical system with three virtual components A, B, C each working on the cloud, etc.).

In this case, the virtual services and the network components that call them do not have to be aware of the obfuscation service, do not need to interface with the obfuscation service or consider the obfuscation service in any way. The existence of the obfuscation service is transparent as far as other services are concerned.

Thus, when the obfuscating service is not in use the system looks like the configuration A. With an obfuscation service raised, all communication is directed to it, and it moves the traffic to the cloud where it unpacks the traffic, as shown in configuration B.

In one embodiment, the obfuscation service customer side (i.e. the physical side) may receive communication from multiple sources. Further, it may mark each communication according to its source in a non-static way. For example, if the obfuscation service customer side receives communication from network components A and B, it will mark that communication with A and B in such a way that knowing that one communication is from A will not help when seeing another one to know if it is from A. Further, the obfuscation service customer side may forward the communication it receives, after marking it, to the counterpart service in the cloud.

The obfuscation service customer side may also receive communication from the cloud side obfuscation service. In this case, the obfuscation service customer side may decode the service in which the communication belongs and forward the communication to the correct network components.

The cloud side obfuscation component may operate in a similar manner. For example, the cloud side obfuscation component may receive communication from multiple sources. Further, it may mark each communication according to its source in a non-static way. The cloud side obfuscation component may forward the communication it receives, after marking it, to the counterpart service on the customer side.

In one embodiment, the obfuscation components may also utilize encryption. Because encryption is expensive in CPUs and a user may not be happy with the level of encryption of all virtual services, obfuscation component encryption enables a system to encrypt at the right time and the right level. As the solution is transparent to the virtual system, data may be encrypted multiple times, once by the service itself and once by the obfuscating service.

Additionally, in one embodiment, the obfuscation components may perform packaging of packets from multiple sources. For example, this functionality may be implemented to receive traffic from multiple network components, package it together, and send it to the cloud where it will be unpacked by the cloud side obfuscator, and vice versa. This may be implemented as the communication may be cheaper and more efficient because one can send longer packages. Additionally, an adversary has less clues to analyze. For example, packet size cannot be used to guess the service. Further, rare services whose traffic is of great interest to the adversary (e.g. alerts, password issues, etc.) will go below the noise ratio and will not be detectable.

In another embodiment, the obfuscation components may perform timing changes. One of the common attacks is timing attacks. An attacker can understand a lot on the communication through time analysis. If packets are sent at regular time (e.g. every 1/1000 of a second, etc.) and not just forwarded, timing attacks become more difficult.

Figure 7:
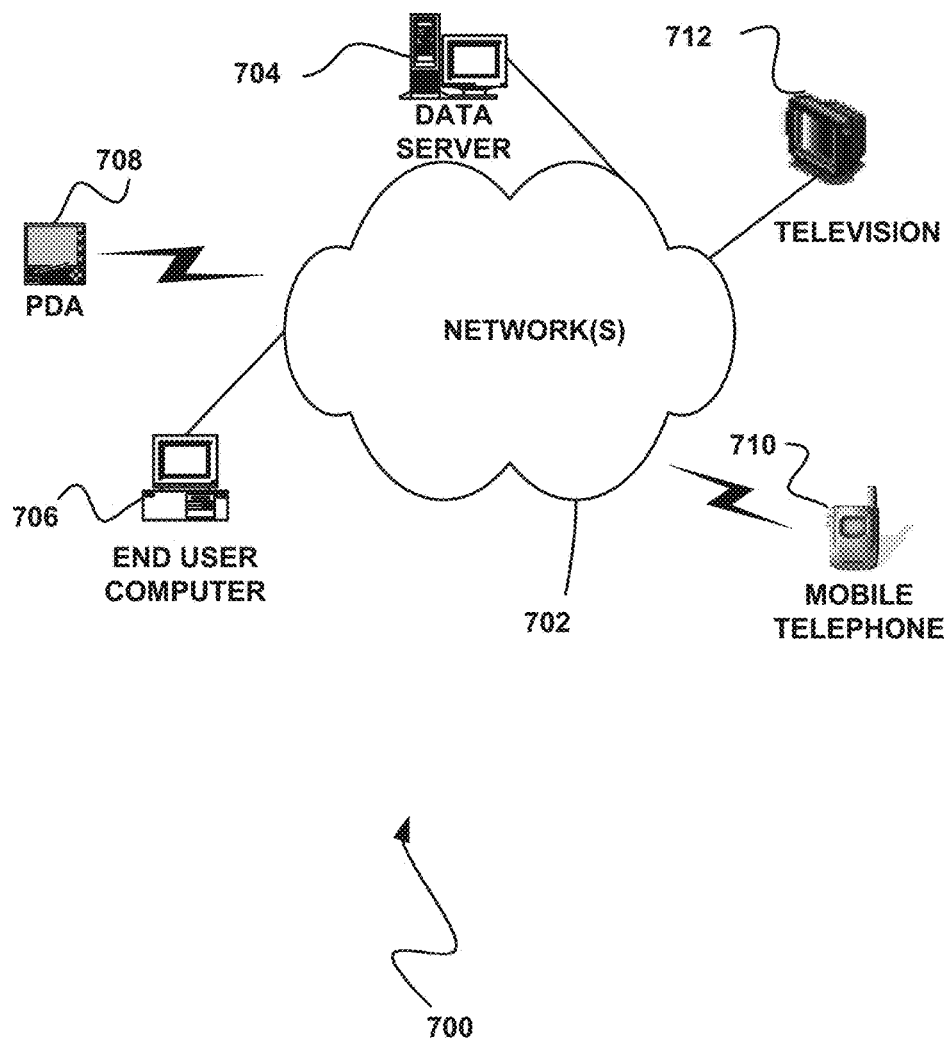
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
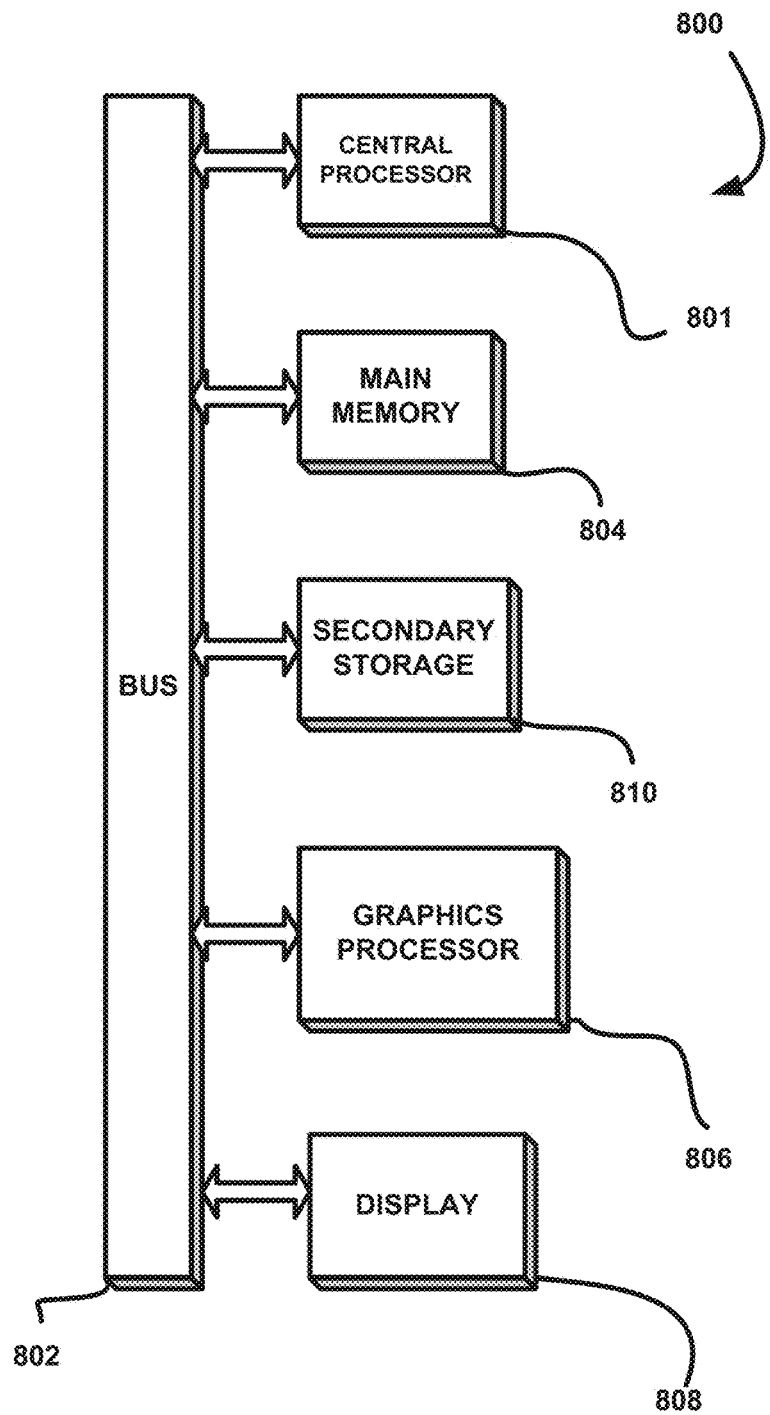
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 responsive to a trigger, initiating a security service in a network function virtualization (NFV)-based network system for obfuscating messages transmitted across the NFV-based network system, the security service including:
  (a) a first obfuscation service component specific to a physical portion of the NFV-based network system that includes a plurality of physical components of the NFV-based network system, the first obfuscation service component including at least one first virtual network function (VNF) that performs a plurality of obfuscation functions including:
  a first obfuscation function that performs packaging of packets received from multiple of the physical components to form first outgoing communications,
  a second obfuscation function that performs encryption of the first outgoing communications,
  a third obfuscation function that performs timing changes of the first outgoing communications,
  a fourth obfuscation function that performs decoding of first incoming communications, and
  a fifth obfuscation function that performs unpacking of the first incoming communications, and
  (b) a second obfuscation service component specific to a cloud-based virtual portion of the NFV-based network system that includes a plurality of virtual services of the NFV-based network system, the second VNF being different from the first VNF, and the second obfuscation service component including the plurality of obfuscation functions including:
  the first obfuscation function that performs packaging of packets received from multiple of the virtual components to form second outgoing communications,
  the second obfuscation function that performs encryption of the second outgoing communications,
  the third obfuscation function that performs timing changes of the second outgoing communications,
  the fourth obfuscation function that performs decoding of second incoming communications, and
  the fifth obfuscation function that performs unpacking of the second incoming communications,
  wherein the security service is transparent with respect to the plurality of physical components and the plurality of virtual services;
 identifying a communication sent from a source that is one of the plurality of physical components in the physical portion of the NFV-based network system, the communication being directed to one or more of the plurality of virtual services in the cloud-based virtual portion of the NFV-based network system;
 responsive to the initiating of the security service and the identifying of the communication, directing the communication from the physical portion of the NFV-based network system to the first obfuscation service component specific to the physical portion of the NFV-based network system;
 responsive to receipt of the communication by the first obfuscation service component, processing the communication by the first obfuscation service component utilizing the first, second, and third obfuscation functions of the plurality of obfuscation functions;
 sending the processed communication from the first obfuscation service component specific to the physical portion of the NFV-based network system to the second obfuscation service component specific to the cloud-based virtual portion of the NFV-based network system;
 responsive to receipt of the communication by the second obfuscation service component, processing the communication by the second obfuscation service component utilizing the fourth and fifth obfuscation functions of the plurality of obfuscation functions and sending the communication from the second obfuscation service component to the one or more virtual services in the cloud-based virtual portion of the NFV-based network system;
 identifying a second communication sent from a second source that is one of the plurality of virtual services in the cloud-based virtual portion of the NFV-based network system, the second communication being directed to one or more of the plurality of physical components in the physical portion of the NFV-based network system;
 responsive to the initiating of the security service and the identifying of the second communication, directing the second communication from the cloud-based virtual portion of the NFV-based network system to the second obfuscation service component specific to the cloud-based virtual portion of the NFV-based network system;
 responsive to receipt of the second communication by the second obfuscation service component, processing the second communication by the second obfuscation service component utilizing the first, second, and third obfuscation functions of the plurality of obfuscation functions;

sending the processed second communication from the second obfuscation service component specific to the cloud-based virtual portion of the NFV-based network system to the first obfuscation service component specific to the physical portion of the NFV-based network system;

responsive to receipt of the second communication by the first obfuscation service component, processing the second communication by the first obfuscation service component utilizing the fourth and fifth obfuscation functions of the plurality of obfuscation functions and sending the second communication from the first obfuscation service component to the one or more physical components in the physical portion of the NFV-based network system.

2. The method of claim 1, wherein the timing changes are utilized to prevent timing attacks.

3. The method of claim 1, wherein the plurality of obfuscation functions of the first obfuscation service component further includes a sixth obfuscation function that performs padding of the first outgoing communications to obfuscate an amount of traffic that is occurring, and wherein the plurality of obfuscation functions of the second obfuscation service component further includes the sixth obfuscation function that performs padding of the second outgoing communications to obfuscate the amount of traffic that is occurring.

4. The method of claim 1, wherein the trigger for initiating the the security service is a warning being received.

5. The method of claim 1, wherein the trigger for initiating the the security service is handling of sensitive data.

6. A computer program product embodied on a non-transitory computer readable medium, comprising:

computer code, responsive to a trigger, for initiating a security service in a network function virtualization (NFV)-based network system for obfuscating messages transmitted across the NFV-based network system, the security service including:

(a) a first obfuscation service component specific to a physical portion of the NFV-based network system that includes a plurality of physical components of the NFV-based network system, the first obfuscation service component including at least one first virtual network function (VNF) that performs a plurality of obfuscation functions including:

a first obfuscation function that performs packaging of packets received from multiple of the physical components to form first outgoing communications, a second obfuscation function that performs encryption of the first outgoing communications, a third obfuscation function that performs timing changes of the first outgoing communications, a fourth obfuscation function that performs decoding of first incoming communications, and a fifth obfuscation function that performs unpacking of the first incoming communications, and (b) a second obfuscation service component specific to a cloud-based virtual portion of the NFV-based network system that includes a plurality of virtual services of the NFV-based network system, the second VNF being different from the first VNF, and the second obfuscation service component including the plurality of obfuscation functions including:

the first obfuscation function that performs packaging of packets received from multiple of the virtual components to form second outgoing communications, the second obfuscation function that performs encryption of the second outgoing communications, the third obfuscation function that performs timing changes of the second outgoing communications, the fourth obfuscation function that performs decoding of second incoming communications, and the fifth obfuscation function that performs unpacking of the second incoming communications, wherein the security service is transparent with respect to the plurality of physical components and the plurality of virtual services;

computer code for identifying a communication sent from a source that is one of the plurality of physical components in the physical portion of the NFV-based network system, the communication being directed to one or more of the plurality of virtual services in the cloud-based virtual portion of the NFV-based network system;

computer code, responsive to the initiating of the security service and the identifying of the communication, for directing the communication from the physical portion of the NFV-based network system to the first obfuscation service component specific to the physical portion of the NFV-based network system;

computer code, responsive to receipt of the communication by the first obfuscation service component, for processing the communication by the first obfuscation service component utilizing the first, second, and third obfuscation functions of the plurality of obfuscation functions;

computer code for sending the processed communication from the first obfuscation service component specific to the physical portion of the NFV-based network system to the second obfuscation service component specific to the cloud-based virtual portion of the NFV-based network system;

computer code, responsive to receipt of the communication by the second obfuscation service component, for processing the communication by the second obfuscation service component utilizing the fourth and fifth obfuscation functions of the plurality of obfuscation functions and sending the communication from the second obfuscation service component to the one or more virtual services in the cloud-based virtual portion of the NFV-based network system;

computer code for identifying a second communication sent from a second source that is one of the plurality of virtual services in the cloud-based virtual portion of the NFV-based network system, the second communication being directed to one or more of the plurality of physical components in the physical portion of the NFV-based network system;

computer code, responsive to the initiating of the security service and the identifying of the second communication, for directing the second communication from the cloud-based virtual portion of the NFV-based network system to the second obfuscation service component specific to the cloud-based virtual portion of the NFV-based network system;

computer code, responsive to receipt of the second communication by the second obfuscation service component, for processing the second communication by the second obfuscation service component utilizing the first, second, and third obfuscation functions of the plurality of obfuscation functions;

computer code for sending the processed second communication from the second obfuscation service component specific to the cloud-based virtual portion of the NFV-based network system to the first obfuscation service component specific to the physical portion of the NFV-based network system;

computer code, responsive to receipt of the second communication by the first obfuscation service component, for processing the second communication by the first obfuscation service component utilizing the fourth and fifth obfuscation functions of the plurality of obfuscation functions and sending the second communication from the first obfuscation service component to the one or more physical components in the physical portion of the NFV-based network system.

7. A system comprising:

a memory system; and one or more processing cores coupled to the memory system and that are configured to:

initiate, responsive to a trigger, a security service in a network function virtualization (NFV)-based network system for obfuscating messages transmitted across the NFV-based network system, the security service including:

(a) a first obfuscation service component specific to a physical portion of the NFV-based network system that includes a plurality of physical components of the NFV-based network system, the first obfuscation service component including at least one first virtual network function (VNF) that performs a plurality of obfuscation functions including:

a first obfuscation function that performs packaging of packets received from multiple of the physical components to form first outgoing communications, a second obfuscation function that performs encryption of the first outgoing communications, a third obfuscation function that performs timing changes of the first outgoing communications, a fourth obfuscation function that performs decoding of first incoming communications, and a fifth obfuscation function that performs unpacking of the first incoming communications, and (b) a second obfuscation service component specific to a cloud-based virtual portion of the NFV-based network system that includes a plurality of virtual services of the NFV-based network system, the second VNF being different from the first VNF, and the second obfuscation service component including the plurality of obfuscation functions including:

the first obfuscation function that performs packaging of packets received from multiple of the virtual components to form second outgoing communications, the second obfuscation function that performs encryption of the second outgoing communications, the third obfuscation function that performs timing changes of the second outgoing communications, the fourth obfuscation function that performs decoding of second incoming communications, and the fifth obfuscation function that performs unpacking of the second incoming communications, wherein the security service is transparent with respect to the plurality of physical components and the plurality of virtual services;

identify a communication sent from a source that is one of the plurality of physical components in the physical portion of the NFV-based network system, the communication being directed to one or more of the plurality of virtual services in the cloud-based virtual portion of the NFV-based network system;

responsive to the initiating of the security service and the identifying of the communication, direct the communication from the physical portion of the NFV-based network system to the first obfuscation service component specific to the physical portion of the NFV-based network system;

responsive to receipt of the communication by the first obfuscation service component, process the communication by the first obfuscation service component utilizing the first, second, and third obfuscation functions of the plurality of obfuscation functions;

send the processed communication from the first obfuscation service component specific to the physical portion of the NFV-based network system to the second obfuscation service component specific to the cloud-based virtual portion of the NFV-based network system;

responsive to receipt of the communication by the second obfuscation service component, process the communication by the second obfuscation service component utilizing the fourth and fifth obfuscation functions of the plurality of obfuscation functions and send the communication from the second obfuscation service component to the one or more virtual services in the cloud-based virtual portion of the NFV-based network system;

identify a second communication sent from a second source that is one of the plurality of virtual services in the cloud-based virtual portion of the NFV-based network system, the second communication being directed to one or more of the plurality of physical components in the physical portion of the NFV-based network system;

responsive to the initiating of the security service and the identifying of the second communication, direct the second communication from the cloud-based virtual portion of the NFV-based network system to the second obfuscation service component specific to the cloud-based virtual portion of the NFV-based network system;

responsive to receipt of the second communication by the second obfuscation service component, process the second communication by the second obfuscation service component utilizing the first, second, and third obfuscation functions of the plurality of obfuscation functions;

send the processed second communication from the second obfuscation service component specific to the cloud-based virtual portion of the NFV-based network system to the first obfuscation service component specific to the physical portion of the NFV-based network system;

responsive to receipt of the second communication by the first obfuscation service component, process the second communication by the first obfuscation service component utilizing the fourth and fifth obfuscation functions of the plurality of obfuscation functions and send the second communication from the first obfuscation service component to the one or more physical components in the physical portion of the NFV-based network system.

\* \* \* \* \*